United States Patent [19]

Mesney

[11] 4,174,887

[45] Nov. 20, 1979

[54] ROTATABLE STAGE FOR A CAMERA

[76] Inventor: Douglas T. Mesney, 23 E. 73 St., New York, N.Y. 10021

[21] Appl. No.: 870,358

[22] Filed: Jan. 18, 1878

[51] Int. Cl.² .............................................. G03B 15/00
[52] U.S. Cl. ..................................... 352/87; 354/292; 248/349
[58] Field of Search .................. 354/293, 292; 108/22, 108/23, 94, 103, 139, 142, 20; 352/243, 85, 86, 87; 248/349, 522, 425; 211/1-5; 46/231, 216-218

[56] References Cited

U.S. PATENT DOCUMENTS

| 744,778 | 11/1903 | Menchen | 352/87 |
|---|---|---|---|
| 2,187,085 | 1/1940 | Kisling | 46/218 X |
| 2,581,201 | 1/1952 | Pettit | 46/218 X |
| 2,842,026 | 7/1958 | Reese et al. | 354/293 X |
| 2,932,259 | 4/1960 | Crum | 46/216 X |
| 3,004,571 | 10/1961 | Gerbrandt | 108/139 X |
| 3,032,917 | 5/1962 | Shine | 108/23 |
| 3,415,600 | 12/1968 | Yarbrough | 352/87 |

FOREIGN PATENT DOCUMENTS

| 309653 | 12/1918 | Fed. Rep. of Germany | 108/139 |
|---|---|---|---|
| 1050277 | 2/1959 | Fed. Rep. of Germany | 248/349 |
| 2430737 | 1/1975 | Fed. Rep. of Germany | 248/349 |
| 2362866 | 6/1975 | Fed. Rep. of Germany | 46/216 |

OTHER PUBLICATIONS

Routine & Research Microscopes; Zeiss; 10-1964, pp. 10 & 11.
Wild MZO General Purpose & Research Microscope, Wild/Heerbrugg; 1961, pp. 16 & 17.

*Primary Examiner*—L. T. Hix
*Assistant Examiner*—Shelley Wade
*Attorney, Agent, or Firm*—Hane, Roberts, Spiecens & Cohen

[57] ABSTRACT

A stage for a slide camera has a two-railed circular track on a base. The rails are conductive and connected to a photostat-controlled electric power pack. On the track are a plurality of trucks having upstanding support members which carry a platform with a translucent central region. One of the trucks has a motor which is powered by the electric current in the rails to rotate the platform.

8 Claims, 5 Drawing Figures

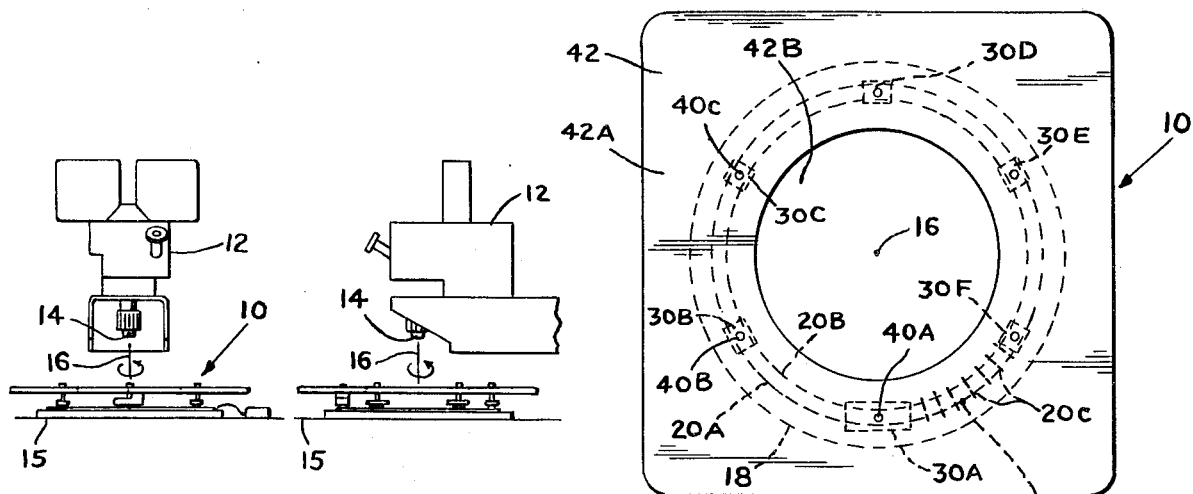
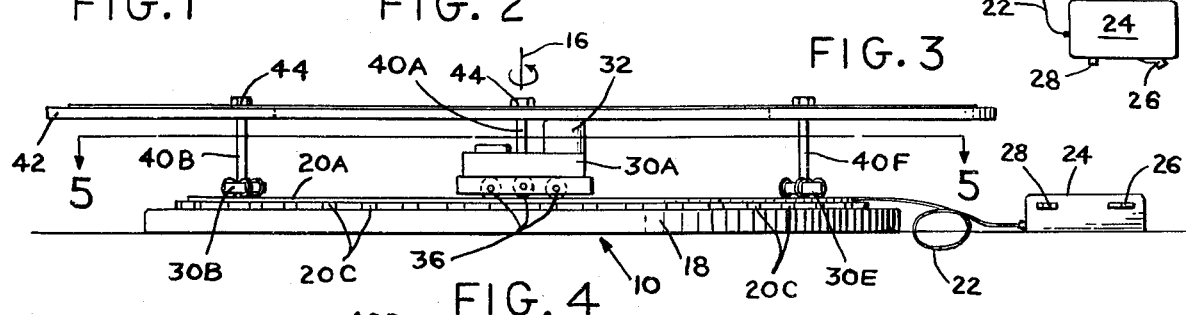
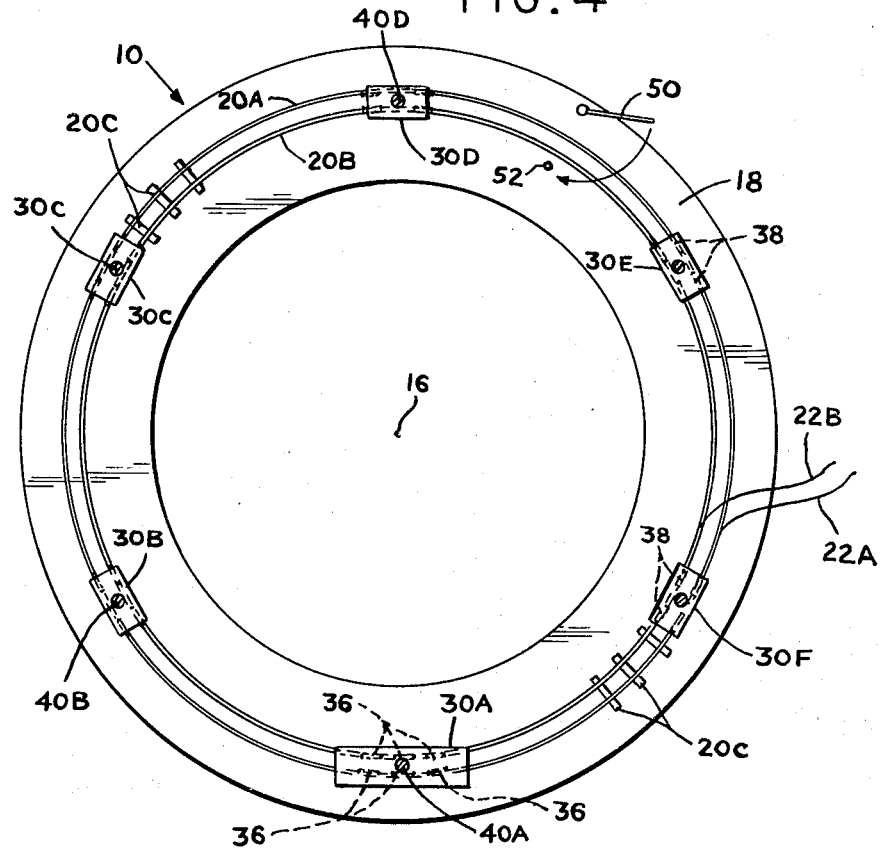
FIG. 1
FIG. 2
FIG. 3
FIG. 4
FIG. 5

ROTATABLE STAGE FOR A CAMERA

BACKGROUND OF THE INVENTION

This invention pertains to photography stages and more particularly to such stages which can be controllably rotated.

In the making of photographic slides, animations and the like a single scene on a transparency or other medium may be photographed in many different positions. One of the more desirable techniques is to produce turn or spin effects. Heretofore such effects required the use of complicated, cumbersome, expensive and slow operating tables.

SUMMARY OF THE INVENTION

It is accordingly an object of the invention to provide an improved rotatable stage for a camera to produce spin and turn effects.

Briefly, the invention contemplates a rotatable stage for a camera having a base upon which there is a circular track of at least two conductive rails which are connected to a source of electric current. Upon the rails and spaced along the track are a plurality of trucks each having an upstanding support member. A platform is mounted on the support members. One of the trucks is electric motorized and is powered by electric current in the rails.

BRIEF DESCRIPTION OF THE DRAWING

Other objects, the features and advantages of the invention will be apparent from the following detailed description of the invention when read with the accompanying drawing which shows by way of example and not limitations the presently preferred embodiment of the invention. In the drawing:

FIG. 1 is a front view of a stage in accordance with the invention positioned below a camera;

FIG. 2 is a side view of the stage and camera configuration of FIG. 1;

FIG. 3 is an enlarged top view of the stage of FIG. 1;

FIG. 4 is an enlarged side view of the stage of FIG. 1; and

FIG. 5 is a view taken along the line 5—5 of FIG. 4.

DESCRIPTION OF THE PREFERRED EMBODIMENT

In FIGS. 1 and 2 the rotatable stage 10 of the invention is positioned in the field of view of the lens 14 of the camera 12. As the camera 12 takes pictures the stage 10 which is carrying a transparency or similar medium upon which is a scene is rotated about axis 16 to produce the spin and turn effects.

In FIGS. 3, 4 and 5 the rotatable stage 10 has a base 18 in the form of a circular annulus upon which is mounted a circular track 20 made up of rails 20A and 20B mechanically aligned concentrically about axis 16 by ties 20C (only some being shown). The ties 20C are of insulating material. Connected to the rails via leads 22A and 22B of cable 22 is a conventional power pack 24 (source of electrical current) which is connectable to the electric mains. The power pack includes a step-down transformer, a rectifier and a rheostat is manually controlled by knob 26 while the power pack is turned on and off by switch 28.

Regularly spaced along the track are the trucks 30A, 30B, 30C, . . . . The truck 30A is multiwheeled vehicle whose flanged wheels engage the tracks 20A and 20B. These wheels 36 have brushes or the like (not shown) which conductively connect the tracks to a drive motor 32. The shaft of the drive motor, via gearing (not shown), is connected to the wheels for moving the truck 30A. The remaining trucks 30B, etc. have free-running wheels 38 without brushes.

Upwardly extending from each truck 30 is a column or support member 40. The support members 40 carry a platform 42 which is fixed to the support members by means of fasteners 44. The platform 40 has a frame portion 42 and a central support area 42B. The support area 42B is either transparent or translucent to permit bottom lighting of a transparency or the like which rests thereon.

In operation, the stage 10 rests on the table 15 of the camera. The table is translucent and bottom or top lighted. Thus the translucent lighting passes through the central opening of base 18 to bottom light the area 42B and any transparencies thereon or top lights the art to be photographed. When a turn or spin effect is desired one need only turn on the power pack 24 by means of switch 28 to start the stage rotating with the speed of rotation being controlled by means of rheostat knob 26.

If a preset home position is desired, a stop means such as rotatable arm 50 is moved in the direction shown against post 52. Thus with the arm 50 against the post 52 a bumper is provided for a truck such as 30E. When the truck engages the bumper the stage stops at a repeatably fixed position. Arms and posts or similar devices can be located at any desired positions.

While only one embodiment of the invention has been shown and described in detail, there will now be obvious to those skilled in the art many modifications and variations without departing from the spirit of the invention as defined by the appended claims. For example, while the track has been shown as a DC-energized two-rail system, it should be apparent that one could as well use an AC-energized three-rail system, or two-rail system with pins extending upward from the center of the ties.

In addition, while only one truck is motorized more than one truck could be motorized if load conditions require it. Also, the central portion of the platform can be either translucent or transparent.

What is claimed is:

1. A rotatable stage for an object to be photographed comprising a base, a circular track on said base, said circular track having at least two conductive rails, a source of electric current connected across said two conductive rails, a plurality of trucks spaced about said track, at least one of said trucks being electric motorized and energized by electric current in said two conductive rails, each of said trucks having an upstanding support member, and a platform fixed to said support members.

2. The stage of claim 1 wherein the central portion of said platform is light transmissive.

3. The stage of claim 2 wherein the base has a central opening.

4. The stage of claim 1 further comprising mechanical stop means for stopping the rotation of the stage at a particular position.

5. The stage of claim 1 wherein said circular track comprises a pair of concentrically parallel rails and tie means for mechanical spacing said rails.

6. The stage of claim 1 wherein said source of electric current includes means for controlling the flow of electric current and thus the speed of rotation of said platform.

7. A rotatable stage for an object to be photographed comprising a base, a circular track on said base, said circular track having at least two conductive rails which are concentrically parallel and tie means for mechanically spacing said rails, a source of electric current connected across said two conductive rails said source of electric current includes means for controlling the flow of electric current and thus the speed of rotation of said platform, a plurality of trucks spaced about said track, at least one of said trucks being electric motorized and energized by electric current in said two conductive rails, each of said trucks having an upstanding support member, a platform fixed to said support members, and mechanical stop means for stopping the rotation of the stage at a particular position.

8. The stage of claim 7 wherein the central portion of said platform is light transmissive and the base has a central opening.